United States Patent [19]

Hinds

[11] 4,295,381
[45] * Oct. 20, 1981

[54] CRANKLESS RECIPROCATING ENGINE AND GYROSCOPIC POWER TRANSMISSION SYSTEM

[76] Inventor: Virgil A. Hinds, 1950 Miller Ave., Ann Arbor, Mich. 48103

[*] Notice: The portion of the term of this patent subsequent to Jul. 24, 1996, has been disclaimed.

[21] Appl. No.: 12,841

[22] Filed: Feb. 16, 1979

Related U.S. Application Data

[63] Continuation-in-part of Ser. No. 785,943, Apr. 8, 1977, Pat. No. 4,161,889.

[51] Int. Cl.³ .................... F16H 29/02; F16H 33/10; G01C 19/00
[52] U.S. Cl. .................... 74/5 R; 74/5.22; 74/126
[58] Field of Search .................... 74/5 R, 5.22, 126; 60/DIG. 1, 516; 92/117 A

[56] References Cited

U.S. PATENT DOCUMENTS

| | | | |
|---|---|---|---|
| 1,518,762 | 12/1924 | Tanner | 74/5 R |
| 1,992,457 | 2/1935 | Anderson | 74/126 X |
| 3,203,644 | 8/1965 | Kellogg | 74/5.22 X |
| 4,161,889 | 7/1979 | Hinds | 74/5 R |

*Primary Examiner*—Rodney H. Bonck
*Attorney, Agent, or Firm*—Hauke and Patalidis

[57] ABSTRACT

A constant torque power transmission consisting of a rotating mass, or gyroscope, rotating around a first axis and supported by a frame or enclosure in turn pivotally supported about a second axis at right angle to the first axis by a gimbal, the gimbal being pivotally supported around a third axis disposed at right angle to the second axis. The reciprocating member of a crankless reciprocating engine, of the free piston or free-cylinder type, oscillates the gimbal and the rotating mass about the third axis, causing the rotating mass frame or enclosure to develop a precessional force oscillating about the second axis. The oscillating precessional force is applied to an output shaft through a one-way clutch assembly.

7 Claims, 7 Drawing Figures

CRANKLESS RECIPROCATING ENGINE AND GYROSCOPIC POWER TRANSMISSION SYSTEM

CROSS-REFERENCE TO RELATED APPLICATIONS

The present application is a continuation-in-part of application Ser. No. 785,943, filed Apr. 8, 1977, for Gyroscopic Power Transmission System, now U.S. Pat. No. 4,161,889.

BACKGROUND OF THE INVENTION

The present invention relates to a prime mover power transmission device converting a reciprocating power input to a rotating output, at a constant average torque.

It is well known that a rotating mass, or gyroscope, tends to remain oriented in a plane perpendicular to its spin axis. When a force is applied to the gyroscope spin axis urging the spin axis to be displaced in a different direction, a precessional momentum or force is induced. If an oscillatory motion is applied to the gyroscope spin axis, the precessional momentum is also oscillatory and is exerted in a plane perpendicular to the spin axis, the oscillatory motion being maximum 90° away from the point of application of the input oscillatory motion.

The present invention provides a constant torque rotating output for an oscillating crankless engine. A gyroscopic transmission, of the type disclosed in prior application Ser. No. 785,943 is disposed between the reciprocating member of the input crankless reciprocating engine and the rotatable output shaft. The transmission comprises a rotating mass or gyroscope which is caused to spin, for example, by way of an electric or fluid motor coupled to its hub shaft. The gyroscope spins relative to an enclosure or frame journally supporting the gyroscope shaft, the enclosure or frame being pivotably supported about an axis within a ring or gimbal. The gimbal is in turn pivotably supported, about an axis disposed at right angle with the axis supporting the gyroscope enclosure or frame, by a pair of support brackets depending from a support plate or base, on which are also mounted the reciprocating engine oscillating member and the rotatable output shaft. The power input consists of a rigid connecting link having an end pivotably connected to the gimbal at a point substantially on the axis around which the gyroscope enclosure or frame is free to pivot. The input connecting link is reciprocated by way of a prime mover consisting of the oscillating member, such as the free piston or free cylinder, of the reciprocating engine coupled to the other end of the connecting link. The output consists of one or a pair of connecting links each having an end pivotably connected to the gyroscope enclosure or frame at a point substantially 90°, in angular position, from the point of application of the input connecting link, i.e., in a plane substantially passing through the axis of pivoting of the gimbal.

When a deflection is applied to the gimbal, and consequently to the gyroscope enclosure or frame, by the input connecting link, the gyroscope enclosure or frame is precessionally displaced, and the reaction of the pivot bearing causes the gyroscope enclosure or frame to oscillate about its axis of pivoting and thus causes reciprocation of the output connecting links. The reciprocating motion of the output connecting links is transformed into a rotary motion of the output shaft, by means of one-way clutches provided with an eccentric crank pin to which the end of the connecting link is connected.

Crankless reciprocating engines of the internal combustion type, as well as of the external combustion type such as Stirling-type engines, have been known for quite some time. Crankless reciprocating engines of the internal combustion type may be of the spark ignition or of the compression ignition, or diesel, type. Such engines have a free piston which is reciprocated within the cylinder. One side of the free piston faces the combustion chamber and the other side acts as a compressor piston, for example for a built-in compressor disposed at the other end of the cylinder. The reciprocating motion of the piston opens appropriate inlet and outlet ports through the wall of the cylinder, the inlet ports admitting to the combustion chamber an appropriate air-fuel mixture in the ignition combustion type of engine, or an appropriate amount of air into which fuel is injected at the end of the compression stroke of the piston in compression ignition engines. During combustion of the fuel-air mixture, the piston is propelled in the direction compressing air in the compressor portion of the cylinder, the outlet port is open, thus permitting the combustion residual gases to exhaust, and the piston is returned towards the combustion chamber through its compression stroke by the air pressure remaining in the compressor chamber. In view of the difficulty in transforming the reciprocating motion of the piston into, for example, a rotating motion, the exhaust gases from the engine drive an outlet gas turbine, for example, which provides such rotary motion by driving, generally through a gear reduction drive, an output shaft while the air compressed in the compressor is used for scavenging and sometime supercharging the engine combustion chamber.

In Stirling-type engines, the power for reciprocating the piston, instead of being obtained as a result of igniting a fuel-air mixture drawn into the combustion chamber is obtained from the rapid expansion of a fluid, generally a gas, situated in an expansion space in the cylinder. Heat is applied to the walls of the cylinder expansion space from the outside by way of a gas burner, concentrated solar heat, or the like. A displacer piston moves the hot gas from the hot expansion space through a regenerator to a cooling space, and the cooled gas is returned by the displacer piston to the expansion space through the regenerator in which it is pre-heated. In modern Stirling-type engines, helium is often used as the working gas, and the piston works against a bounce gas, such as air, contained in a chamber in the cylinder opposite to the expansion space or chamber, which acts to cushion the piston reversal and to push the piston to reduce the volume of the expansion space prior to expansion of the hot gas. Often, air is introduced and exhausted from the bounce gas chamber by means of appropriate poppet valves or reed valves, such that the bounce gas chamber acts as a source of compressed air. Applications have been made of Stirling engines, using for example solar heat energy as the source of heat, to provide electricity, by placing a magnet in the mass of the engine piston and disposing in the cylinder wall an appropriate stator winding in which electric power is generated.

Only indirect means have heretofore been proposed for converting the energy developed by a crankless reciprocating engine, such as for example utilizing the exhaust gases for running a gas turbine, using the reciprocation of the piston to compress air or a gas, to pump a fluid, gas or liquid, or to generate electricity. Direct conversion of the reciprocating motion of the piston into the more familiar rotating motion of a shaft can be accomplished only by a conventional connecting rod-crankshaft transmission mechanism, the connecting rod being conventionally attached at one end to the piston, thus converting the crankless engine into a conventional crankshaft engine, and destroying the simplicity of structure and operation of crankless reciprocating engines.

As there is no mechanical connection between the piston and the cylinder in crankless engines, if the piston is made relatively massive, that is with a high inertia, and the cylinder relatively light, that is with a low inertia, the cylinder is caused to oscillate relative to the piston rather than the piston relative to the cylinder. The present invention is addressed to a mechanical arrangement for converting the reciprocating motion of a crankless reciprocating engine, preferably of the reciprocating cylinder type, to a rotation motion of an output shaft by means of a gyroscopic transmission, the oscillating cylinder being slidably supported by way of a stationary sleeve or by means of appropriate linear guiding ways relative to a stationary frame or platform or, alternatively, being spring mounted such as to be free to oscillate during the reciprocation of the piston.

Attempts have been made in the past to couple the oscillating cylinder of free-piston engines to a crankshaft. Because oscillating cylinder engines have their own natural operating frequency and seek their own stroke length, they are not compatible with direct coupling to a crankshaft through a connecting rod, and it has been observed that oscillating cylinder engines run a crankshaft in one direction, and then suddenly begin running the crankshaft in an opposite direction. It has been further observed that oscillating cylinder engines run very poorly in either direction.

A further problem associated with oscillating cylinder engines as a result of the cylinder oscillating at its own natural resonant frequency is that load variations at their output do not alter the frequency noticeably, but they do alter the stroke amplitude, which is incompatible with a rod and crankshaft mechanism for converting reciprocating motion to rotating motion. The gyroscopic transmission of the present invention permits to readily transform the variable amplitude reciprocation of an oscillating cylinder engine to a rotating motion at a substantially constant torque.

SUMMARY OF THE PRESENT INVENTION

The present invention accomplishes its principal purpose by providing a power transmission converting the reciprocating motion of a prime mover into a rotating motion operating substantially at constant torque, and which is capable of transmitting torque with only negligible losses, due to frictional forces in the pivots and a gyroscope shaft bearings, and which is capable of developing at its output a very high torque to a stalled or nearly stalled drive shaft with a relatively low power input. The present invention, consequently, has many applications such as for motor vehicle transmission systems. More particularly, in prime mover power transmission assemblies for motor vehicles, the present invention permits to provide an individual drive for each wheel, such individual drive being disposed at, or proximate to, each wheel which it drives, and to dispense with variable ratio mechanical or hydraulic transmissions and clutches, and even differentials in some applications.

The many objects and advantages of the present invention will become apparent to those skilled in the art when the following description of the best modes contemplated for practicing the invention is read in conjunction with the accompanying drawing wherein:

DETAILED DESCRIPTION OF THE PREFERRED EMBODIMENTS

Figure 1:
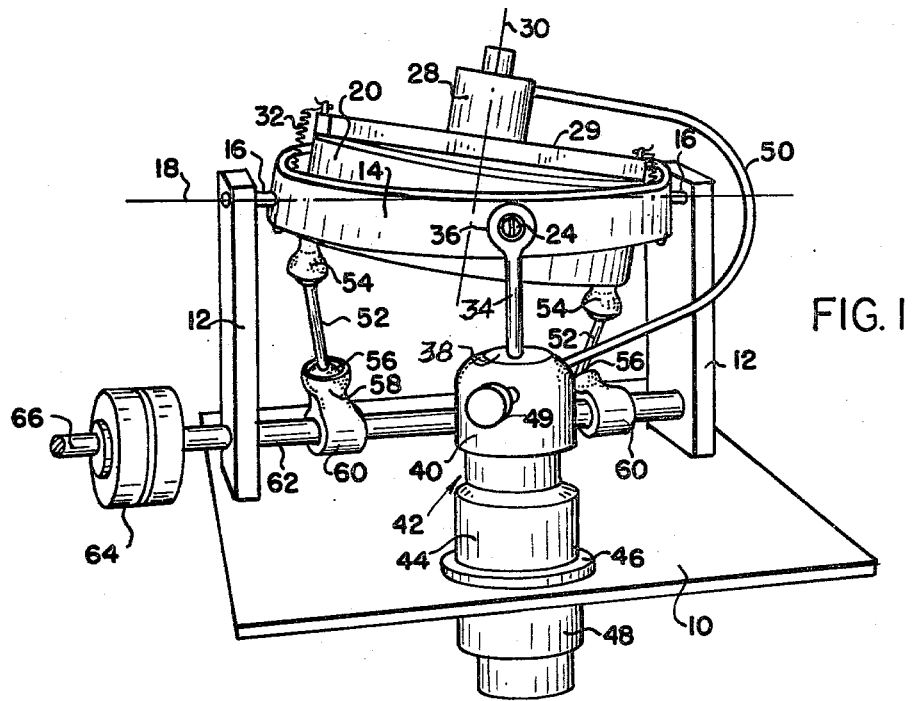
FIG. 1 is a perspective schematic view of an example of prime mover power transmission assembly according to the present invention.
Figure 2:
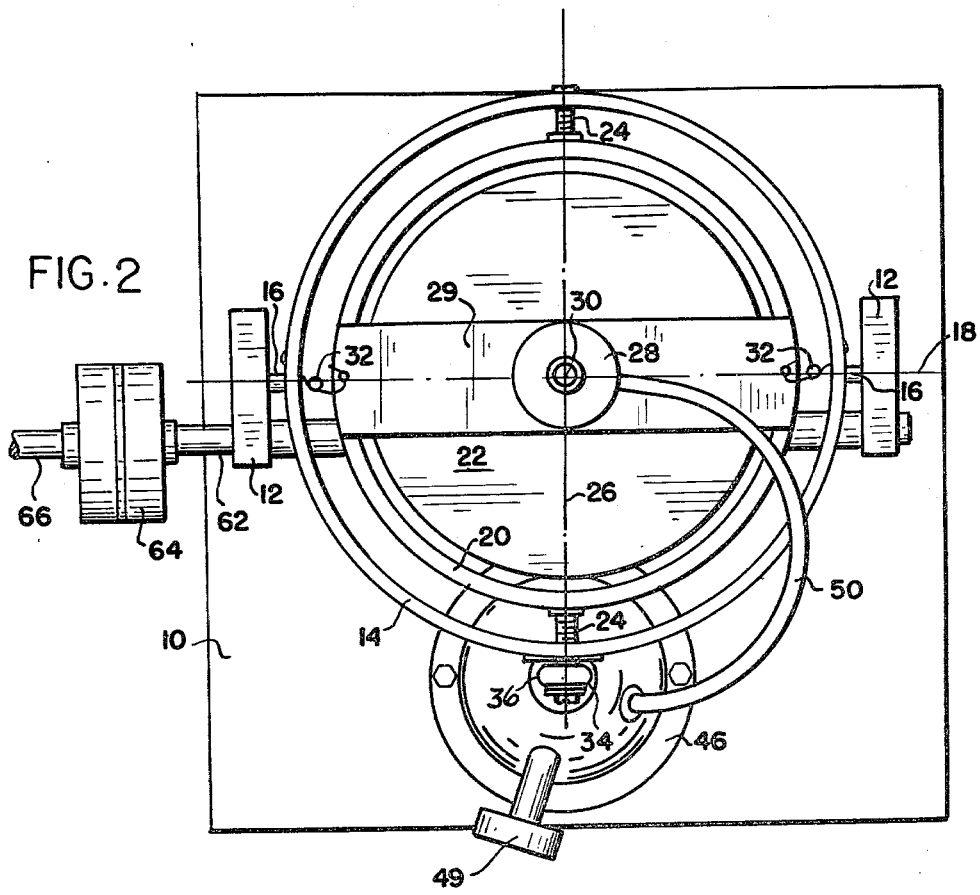
FIG. 2 is a top plan view thereof.

Referring now to FIGS. 1-2, a support base 10 is illustrated provided with a pair of parallel upright brackets 12. The upright brackets support a gimbal ring 14 by means of a pair of pivot members 16. The pivot members 16 define a pivot axis 18 for the gimbal ring 14, the pivot axis 18 being aligned with a diameter of the gimbal ring 14. The gimbal ring 14 in turn pivotably supports an enclosure or frame 20 for a rotating mass, or gyroscope, 22 by way of pivot members 24. The pivot members 24 support the gyroscope enclosure or frame 20 within the gimbal ring 14 along a pivot axis 26 which is angularly disposed 90° away from the pivot axis 18 of the gimbal ring 14 relative to the support brackets 12.

Any convenient means can be used for spinning the gyroscope 22 at high velocity such as, for example, an electric motor (not shown) or an air motor 28 coupled to the gyroscope hub shaft, not shown, the latter being journalled in appropriate bearing members fitted in the end plates 29 of the gyroscope enclosure or frame 20. The spin axis 30 of the gyroscope 22 is therefore substantially perpendicular to the plane defined by the two pivot axes 18 and 26, when the enclosure or frame 20 and the gimbal ring 14 are in a neutral position, i.e., when they are concentric to each other and co-planar. A pair of return springs 32 are used to urge the gyroscope enclosure or frame 20 and the gimbal ring 14 to the neutral position wherein the spin axis 30 of the gyroscope 22 is substantially orthogonal to the plane of the pivot axes 18 and 26.

The gimbal ring 14 and the gyroscope frame or enclosure 20 are capable of oscillating in unison about the pivot axis 18 of the gimbal ring, relative to the support bracket members 12. Oscillating motion is applied to the gyroscope and gimbal assembly by an input connecting link 34 having an end connected through a socket and ball bearing 36 to the projecting end of the pivot member 24, pivotably supporting the gyroscope enclosure or frame 20 relative to the gimbal ring 14, such that reciprocation of the input connecting link 34 is transmitted to the gimbal ring 14 and, through the pivots 24, to the gyroscope enclosure or frame 20 in a plane defined by the pivoting axis 26 and the gyroscope spinning axis 30.

In the example of structure illustrated, the input connecting link 34 is reciprocated as a result of its other end being fastened, by means of a ball and socket bearing member 38, to the end of the cylinder 40 of an external combustion engine 42 of the Stirling-type. The cylinder 40 is free to oscillate when the piston, not shown, of the Stirling-type engine 42 reciprocates within the cylinder, and is supported slidably within a support sleeve 44 fastened on top of the support base 10 by means of an integral flange 46. A heat source 48 is mounted below the support base 10, the heat being obtained by means of an appropriate torch or burner burning any appropriate gaseous or liquid fuel. In the alternative, in some non-vehicular applications of the invention, the heat source may consist of solar thermal energy impinging upon the absorber cavity of the Stirling-type engine 42, as disclosed in Popular Science magazine of June, 1978, pages 74-77.

The bounce air chamber, not shown, disposed at the top of the cylinder 40 of the Stirling-type engine 42 is adapted to work as an air compressor by being provided with a filtering inlet 49 drawing air from the ambient through an appropriate poppet or reed valve, not shown, for feeding compressed air through a flexible line 50 to the gyroscope air motor 28, for spinning the gyroscope 22 about its rotation axis 30.

Figure 3:
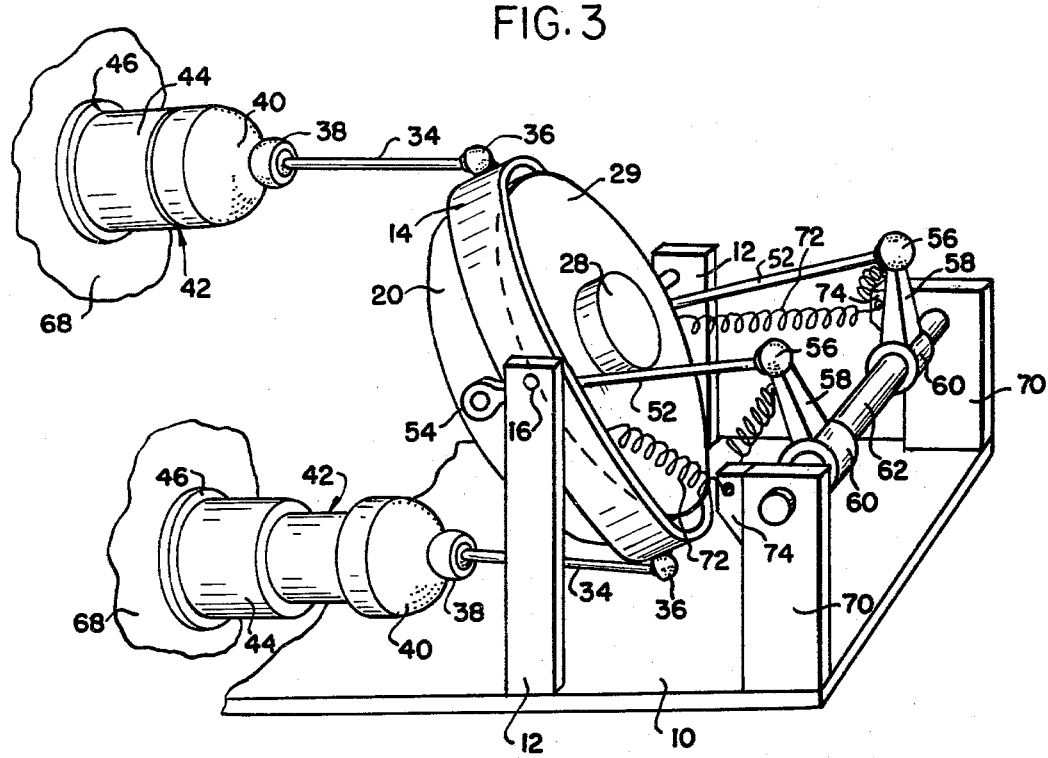
FIG. 3 is a schematic view similar to FIG. 1 but showing a modification thereof.

It is readily apparent that a pair of input connecting links could be connected to the gimbal ring 14, at diametrically opposed positions along the axis 26, each connecting link being oscillated by a separate prime mover, as illustrated at FIG. 3.

Referring again to FIGS. 1-2, a pair of output connecting links 52 are each pivotally attached at an end to the gyroscope enclosure or frame 20, by means of a ball and socket coupling 54. The other end of each output connecting link 52 is connected, by means of a ball and socket coupling 56, to an eccentric crank pin 58 projecting from the housing of a one-way clutch 60 mounted on an output shaft 62 journalled through the support brackets 12. In this manner, any reciprocating motion of the output connecting links 52 is converted by the one-way clutches 60 into a unidirectional rotation of the output shaft 62, thus converting the torque applied to the output connecting links 52 into a torque applied to the output shaft 62. Although a single output connecting link 52 could be used, for the purpose of balance and for a better application of torque forces to the output shaft 52, in the example of the invention here illustrated a pair of output connecting links 52 are provided, one of which has its end 51 pivotably attached to the crank pin 58 of a one-way clutch 60 on one side of the output shaft 62 and the other has its end 51 pivotably attached to the crank pin of a one-way clutch 60 angularly disposed on the other side of the output shaft 62, such as to balance the load on the journal bearings of the output shaft 62. The output shaft is connected through a coupling or clutch 64 to the input shaft 66 of the machinery, not shown, to which power is supplied, such as, for example, the drive shaft of a motor vehicle.

Oscillation of the gimbal 14 and of the gyroscope enclosure or frame 20 about the pivot axis 18 causes, through precessional force action and its reaction applied through the pivot members to the support brackets 12 and the base 10, a force tending to rotate the direction of the gyroscope spinning axis 30 in a plane containing the pivot axis 18. Consequently, the precessional force is exerted as a torque having an axis of pivoting corresponding to the free axis of pivoting of the gyroscope enclosure or frame 20 within the gimbal ring 14, that is about the pivot axis 26, 90° in angular position away from the gimbal pivot axis 18 relative to the support brackets 12. Therefore, reciprocation of the input connecting link 34 is transformed into reciprocation, in opposite directions, of the output links 52 which, through the one-way clutches 60, is converted into a rotary motion of the output shaft 62.

A considerable torque can be transmitted to the output of the power transmission system of the invention, with very low input power. For a given power input, a given mass and angular velocity of the gyroscope 22, the torque at the output of the system can be calculated as follows:

Spinning gyroscopes develop a precessional force according to the following equation:

$$Rl = I\omega_1 \omega_2, \tag{1}$$

wherein

R is precessional force;

l is the length of the lever arm through which the precessional force, R, is applied;

I is the inertia of the gyroscope about its spinning axis;

$\omega_1$ is the angular velocity of the force applied to the gyroscope and tending to displace its spinning axis direction, therefore the angular velocity expressed in rad/sec of the input connecting link; and $\omega_2$ is the angular velocity of the gyroscope wheel in rad/sec.

The inertia of the gyroscope about its spin axis is given by the equation:

$$I = Wr^2/g \tag{2}$$

wherein W is the weight of the gyroscope, r is the effective radius of the gyroscope wheel, and g is gravitational acceleration, or 32 ft/sec².

For example, a gyroscope wheel 22 having a weight of 6 lbs., an effective radius of 6 in., and l being equal to 6 in., and assuming that the gyroscope frame 20, together with the gimbal ring 14, is driven by the input connecting link 34 plus and minus 15° about the pivot axis 18, for a total of 30° deflection, the gyroscope enclosure or frame 20 is moved through 60° during a single revolution of the eccentric 40. 60° is equivalent to $\pi/3$ radians. If the input eccentric 40 is rotated at 3,000 rpm, or 50 rev/sec. $\omega_1$ is therefore $50\pi/3$ rad/sec. With a gyroscope 22 rotating at 18,000 rpm, or 300 rev/sec., $\omega_2$ equals $300 \times 2\pi$ or $600\pi$ rad/sec.

By replacing I in equation (1) by its value obtained from equation (2), and by resolving equation (1) as a function of R, the following equation is obtained:

$$R = \frac{Wr^2 \omega_1 \omega_2}{lg} = \frac{6 \times (.5)^2 \times 50 \times \frac{\pi}{3} \times 600\pi}{.5 \times 32} \tag{3}$$

$$= 9252.7525 \text{ lbs.}$$

With a crank pin 58 of the one-way clutches 60 having its axis 3 in., or 0.25 ft., from the axis of the output shaft 62, the torque applied to the output shaft is consequently equal to 9252.7525 lbs. × 0.25 = 2313.1881 ft-lbs.

It will therefore be readily appreciated that the apparatus of the invention is capable of developing at its output a very substantial torque, in spite of a relatively small size of the diverse elements, as shown by the numerical example hereinabove, given for illustrative purposes only.

In view of the high torque developed at the output of the power transmission apparatus of the present invention, it will also be readily apparent that the invention has many applications in various apparatus. For example, the output can be utilized to operate a hoist, a crane, an elevator, a winch or the like. Torque is increased at the output by increasing $\omega_1$ or $\omega_2$, or both until the torque overcomes gravity or frictional loads. Therefore the load displaced by the output is accelerated at a controlled and progressive rate.

The apparatus of the invention can be adapted to provide individual drive for each powered wheel of a multiple-wheel drive motor vehicle. As torque is applied to each wheel individually, there is no need for a differential.

Figure 4A:
FIGS. 4a and 4b represent wave forms of the motion and acceleration, respectively, of the oscillating member of a crankless reciprocating engine.
Figure 4B:
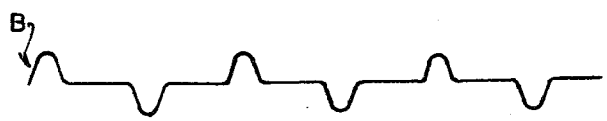
Figure 5A:
FIGS. 5a and 5b represent respectively wave forms of the motion and acceleration of a crankless reciprocating engine coupled to a rotating output shaft through a gyroscopic power transmission according to the present invention.
Figure 5B:

Among the advantages of the present invention while using a free piston or free cylinder engine of the internal combustion type as well as the external combustion type (Stirling-type) is that of dampening or snubbing the mechanical stress imposed upon the elements of the engine as a result of the oscillating member of such engines being subjected to a substantial destructive shock acceleration during each reciprocation. Waveform A of FIG. 4a illustrates graphically the velocity of a free piston or free cylinder reciprocating engine which is in the form of a truncated sine wave provided with straight portions $A_1$, corresponding to constant velocity time periods, separated by continuously variable velocity time intervals $A_2$. Waveform B of FIG. 4b is a waveform of the corresponding acceleration and deceleration of the oscillating member drawn on the same time scale as the velocity waveform A of FIG. 4a. It can be seen that the oscillating member of a free running free-piston or free-cylinder engine is subjected to successive positive and negative acceleration impulses at a relatively high frequency which cause considerable engine vibration, thus requiring a shock absorbing suspension of the engine housing when supported from a rigid support base or frame. Coupling the oscillating output member of the same free-piston or free-cylinder reciprocating engine to an output shaft through the gyroscopic motion converting transmission device of the invention considerably dampens the velocity waveform and the acceleration waveform of the engine oscillating member of FIGS. 4a–4b to the substantially sine wave velocity waveform A' of FIG. 5a and acceleration waveform B' of FIG. 5b.

A pair of separate identical prime movers, each in the form of an oscillating cylinder engine 42 for example, as shown at FIG. 3, may be used for coupling 180° apart to the gyroscope gimbal ring 14. In the arrangement illustrated at FIG. 3, the oscillating engine cylinders 40 are each coupled to the gimbal ring 14 by means of a link 34 and a socket and ball bearing 36. Each cylinder 40 is slidably supported in a stationary support sleeve 44, or other linear guide means, which is mounted on a support plate 68 fastened at an angle to the support plate or base 10.

The output shaft 62 journals in a pair of parallel support blocks 70 mounted on the support base 10, and is coupled to the housing or frame 29 of the gyroscope by means of a pair of parallel output links or rods 52 whose free end of each is connected through a socket and ball joint 56 to the crank arm 58 of a one-way clutch 60, in the same manner as hereinbefore explained. A pair of return springs 72 are each attached at one end to the end of a crank arm 58, at their other end to the socket and ball connection 54 between the output link 52 and the gyroscope housing or frame 29, and at an intermediary portion of their length to a stationary bracket such as a bracket 74 fastened on each output shaft support block 70. The differential action of the springs 72 urge the gyroscope housing 29 to a neutral position, in the same manner as the springs 32 of FIG. 1.

The operation of the structure of FIG. 3 is the same as the operation of the structure of FIGS. 1-2, except that the power stroke of the oscillating members, such as the cylinders 40, of the separate oscillating engines 42 must be synchronized 180° out-of-phase, such as to alternate the forces applied 180° from each other around the gimbal ring 14. Such synchronization can easily be achieved by means of a swinging lever mechanical link between the two engines or simply by starting one engine before the other. As the two engines are identical and therefore operate at the same oscillation resonant frequency, the out-of-phase synchronization between the power strokes of the engines is continuously maintained, irrespective of the stroke amplitude and irrespective of load.

The motor 28 spinning the rotating mass or gyroscope, not shown, enclosed in the housing or frame 29 may be an air motor operated by a flow of compressed air obtained from the bounce gas chamber of the engines 42, in the same manner as described with respect to the structure of FIGS. 1-2, in which case it is preferable to provide for a compressed air accumulator and reservoir to operate the motor 28 to spin the gyroscope prior to starting the oscillating reciprocating engines and bleeding air from their bounce gas chambers. Alternatively, the motor 28 may be an electrical motor operated from an auxiliary electrical power source, at least prior to starting the oscillating reciprocating engine, and which may subsequently be supplied in electrical power by the engines themselves being arranged to induce an electric current in a stator winding disposed around the piston of the engines provided with a magnet.

Having thus described the present invention by way of examples of structural practical embodiments thereof, modifications whereof will be readily apparent to those skilled in the art,

What is claimed as new is as follows:

1. A crankless reciprocating engine and power transmission system comprising means for supporting and substantially linearly guiding an oscillating member of said engine, a mass rotating about a first axis, said rotating mass being in a frame pivotably supported by a gimbal about a second axis at right angle to said first axis, pivot means pivotably supporting said gimbal about a third axis at right angle to said second axis and at variable angle relative to said first axis, means coupling said engine oscillating member to a point of said gimbal for oscillating said gimbal and said rotating mass frame about said third axis, power output means reciprocable by said rotating mass frame when precessionally oscillating about said second axis and biasing means urging said first axis to a position wherein said first axis is orthogonal to said third axis.

2. The system of claim 1 wherein said coupling means comprises a rigid link pivotally attached at one end to said gimbal at a point proximate to said second axis and at the other end to said oscillating member.

3. The system of claim 1 wherein said power output means comprises a rigid link pivotally attached at one end to said frame at a point substantially ninety degrees from said second axis and at its other end to a crank driving a one-way clutch member connected to a rotatable shaft.

4. The system of claim 3 wherein said power output means comprises a second rigid link pivotably attached at one end to said frame at a point substantially ninety degrees from said second axis and at its other end to a crank driving a one-way clutch member connected to said rotatable shaft.

5. The system of claim 1 further comprising a second crankless reciprocating engine, means for supporting and substantially linearly guiding an oscillating member of said engine, and means coupling said second engine oscillating member to said gimbal at a point substantially 180° away from said first-mentioned point.

6. The system of claim 1 wherein said biasing means is a pair of tension springs diametrally connected between said gimbal and said frame.

7. The system of claim 1 wherein said biasing means is a pair of tension springs diametrally connected between said gimbal and a stationary support.

* * * * *